US011506878B2

(12) United States Patent
Sangu

(10) Patent No.: US 11,506,878 B2
(45) Date of Patent: Nov. 22, 2022

(54) CONFOCAL SCANNER, MICROSCOPE SYSTEM, AND CONFOCAL MICROSCOPE

(71) Applicant: Yokogawa Electric Corporation, Tokyo (JP)

(72) Inventor: Hiroyuki Sangu, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 357 days.

(21) Appl. No.: 16/604,292

(22) PCT Filed: Mar. 28, 2018

(86) PCT No.: PCT/JP2018/012712
§ 371 (c)(1),
(2) Date: Oct. 10, 2019

(87) PCT Pub. No.: WO2018/190125
PCT Pub. Date: Oct. 18, 2018

(65) Prior Publication Data
US 2020/0033576 A1 Jan. 30, 2020

(30) Foreign Application Priority Data

Apr. 13, 2017 (JP) .............................. JP2017-079986
Dec. 26, 2017 (JP) .............................. JP2017-249617

(51) Int. Cl.
*G02B 21/00* (2006.01)
*G02B 21/02* (2006.01)

(52) U.S. Cl.
CPC ..... *G02B 21/0036* (2013.01); *G02B 21/0032* (2013.01); *G02B 21/02* (2013.01)

(58) Field of Classification Search
CPC .. G02B 21/00; G02B 21/002; G02B 21/0032; G02B 21/0036; G02B 21/02; G02B 21/06; G02B 21/082; G02B 21/362; G02B 21/24; G02B 21/245
USPC .................................................. 359/368–398
See application file for complete search history.

(56) References Cited

U.S. PATENT DOCUMENTS

| 5,081,350 A | 1/1992 | Iwasaki et al. |
| 6,563,098 B2 * | 5/2003 | Gweon ................ G02B 21/008 250/201.2 |
| 6,867,406 B1 * | 3/2005 | Fairley ............... G01N 21/9501 250/201.3 |

(Continued)

FOREIGN PATENT DOCUMENTS

| JP | 03-172815 A | 7/1991 |
| JP | 04-000409 A | 1/1992 |

(Continued)

*Primary Examiner* — Thong Q Nguyen
(74) *Attorney, Agent, or Firm* — Sughrue Mion, PLLC

(57) ABSTRACT

A confocal scanner mounted on a microscope includes a linear light source configured to emit linear light, a linear detector including a linear detection unit detecting incident light for each line, and a moving mechanism configured to translationally move the linear light source and the linear detector with respect to the microscope. The linear light source and the linear detector are disposed so as to have a positional relationship in which the linear light source and the linear detector correspond to each other within an imaging surface at conjugate positions with respect to a focal plane of the microscope.

17 Claims, 13 Drawing Sheets

(56) References Cited

U.S. PATENT DOCUMENTS

| | | | |
|---|---|---|---|
| 7,301,626 B2* | 11/2007 | Tsuchiya | G02B 21/0076 |
| | | | 250/461.2 |
| 8,599,372 B2* | 12/2013 | Chen | G02B 21/006 |
| | | | 356/300 |
| 2005/0225849 A1 | 10/2005 | Gough | |
| 2006/0209399 A1 | 9/2006 | Mikuriya et al. | |
| 2009/0034062 A1 | 2/2009 | Okugawa | |

FOREIGN PATENT DOCUMENTS

| | | |
|---|---|---|
| JP | 2660613 B2 | 10/1997 |
| JP | 2001-013445 A | 1/2001 |
| JP | 2003-247817 A | 9/2003 |
| JP | 2005-292839 A | 10/2005 |
| JP | 4905356 B2 | 3/2012 |
| WO | 9940471 A1 | 8/1999 |
| WO | 2007/055082 A1 | 5/2007 |

* cited by examiner

CONFOCAL SCANNER, MICROSCOPE SYSTEM, AND CONFOCAL MICROSCOPE

CROSS REFERENCE TO RELATED APPLICATIONS

This application is a National Stage of International Application No. PCT/JP2018/012712 filed Mar. 28, 2018, claiming priority based on Japanese Patent Application No. 2017-079986 filed Apr. 13, 2017 and 2017-249617 filed Dec. 26, 2017, the entire contents of each of which are herein incorporated by reference in their entireties.

TECHNICAL FIELD

The present invention relates to a confocal scanner, a microscope system, and a confocal microscope.

BACKGROUND ART

There are line scanning type confocal microscopes. For example, Japanese Patent No. 4905356 discloses an example in which linear illumination light is projected onto an observation target, return light from the observation target is detected by a linear detector, and the observation target is scanned with the linear illumination light using a scanning mirror.

In addition, Japanese Patent No. 2660613 discloses an example of another line scanning type confocal microscope. In this example, linear illumination light is projected onto an observation target, and return light from the observation target is detected by a linear detector, similar to the example disclosed in Japanese Patent No. 4905356. However, the example disclosed in Japanese Patent No. 2660613 is an example in which the observation target is scanned by translationally moving the entire optical system in one direction.

In addition, Japanese Unexamined Patent Application Publication No. 2001-13445 and Japanese Unexamined Patent Application Publication No. 2003-247817 disclose an example in which a slit array is provided between an objective lens, a light splitting means, and an imaging lens, and scanning is performed by reciprocating the slit array.

SUMMARY

According to an aspect of one or more embodiments, there is provided a confocal scanner mounted on a microscope, the confocal scanner comprising a linear light source configured to emit linear light; a linear detector including a linear detection unit detecting incident light for each line; and a moving mechanism configured to translationally move the linear light source and the linear detector with respect to the microscope, wherein the linear light source and the linear detector are disposed so as to have a positional relationship in which the linear light source and the linear detector correspond to each other within an imaging surface at conjugate positions with respect to a focal plane of the microscope.

DETAILED DESCRIPTION

Figure 1:
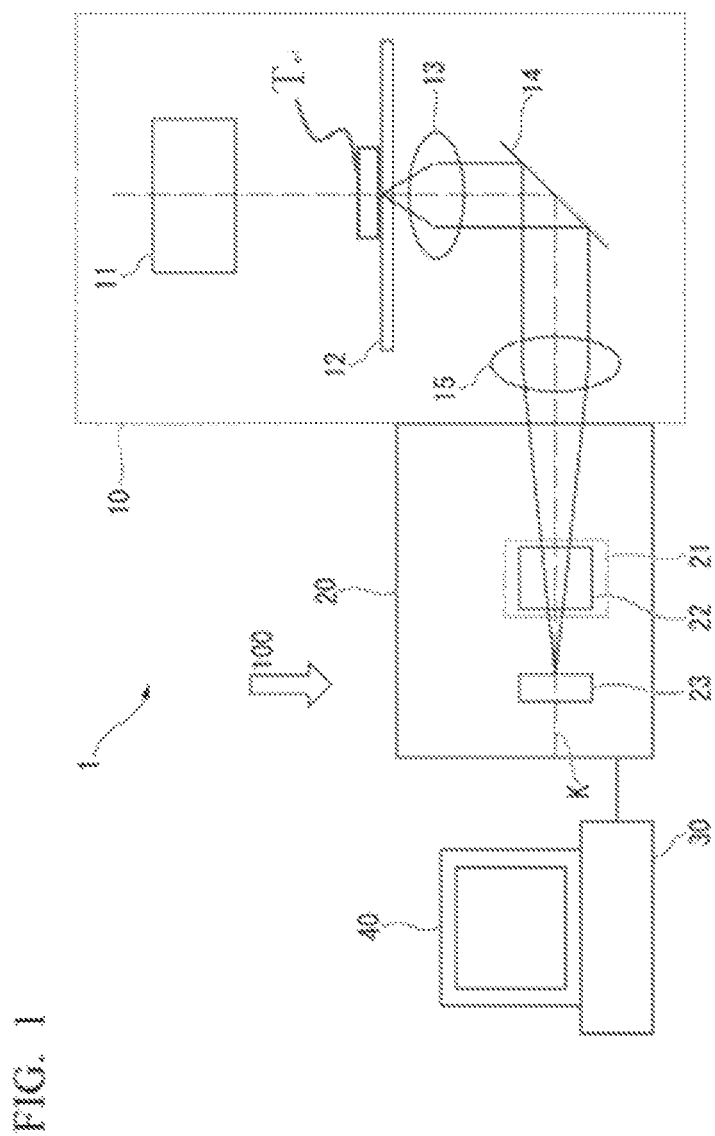
FIG. 1 is a diagram showing an example of a configuration of a microscope system according to a first embodiment.

The scanning mirror used in Japanese Patent No. 4905356 is capable of performing high-speed scanning, but has a disadvantage that the scanning mirror is generally expensive and thus a system becomes expensive. Further, in a case where a scanning mirror is disposed, it is preferable that the scanning mirror be generally disposed at a pupil position of an objective lens. However, the pupil position of the objective lens is not suitable for the disposition of the scanning mirror because the pupil position of the objective lens is located inside the objective lens or in the vicinity of a mounting position.

For this reason, in general, a scanning mirror needs to transmit a pupil position of an objective lens using a relay lens, which results in a disadvantage that the entire optical system becomes large.

In addition, according to a technique disclosed in Japanese Patent No. 2660613, it is necessary to translationally move the entire optical system as a scanning method, and thus it is difficult to mount the optical system on a manual microscope or the like already possessed, which results in a disadvantage that a special microscope is required.

In addition, in techniques disclosed in Japanese Unexamined Patent Application Publication No. 2001-13445 and Japanese Unexamined Patent Application Publication No. 2003-247817, a slit is disposed on an imaging surface enlarged by a microscope, light having passed through the slit is projected onto a focal plane of the microscope, and light having passed through the slit in the returned light is imaged by an imaging element using a relay lens system. In the microscope, the relay lens system transmitting an image of an imaging surface of the microscope is required, which results in a disadvantage that an optical system becomes large.

An aspect of various embodiments is contrived in view of the above-described circumstances, and provides a confocal scanner, a microscope system, and a confocal microscope which are capable of obtaining a confocal microscope image with a simple configuration.

In order to address the above-described problems, an aspect of one or more embodiments is a confocal scanner mounted on a microscope, the confocal scanner may include a linear light source configured to emit linear light, a linear detector including a linear detection unit detecting incident light for each line, and a moving mechanism configured to translationally move the linear light source and the linear detector with respect to the microscope, in which the linear light source and the linear detector are disposed so as to have a positional relationship in which the linear light source and the linear detector correspond to each other within an imaging surface at conjugate positions with respect to a focal plane of the microscope.

In addition, according to an aspect of one or more embodiments, in the confocal scanner, the linear light source and the linear detector may be split by a splitting optical system disposed between an imaging lens included in the microscope and an image surface of the imaging lens, and the linear light source and the linear detector may be directly disposed on the imaging surface of the imaging lens.

In addition, according to an aspect of one or more embodiments, in the confocal scanner, the moving mechanism may translationally move the linear light source and the linear detector on an imaging surface of the microscope while maintaining the positional relationship in which the linear light source and the linear detector correspond to each other.

In addition, according to an aspect of one or more embodiments, in the confocal scanner, the linear light source and the linear detector may be disposed so as to have a positional relationship in which a plane determined from a longitudinal direction of the linear light source and an optical axis direction of light emitted from the linear light source and a plane determined from a longitudinal direction of the linear detector and an optical axis direction of light incident on the linear detector are the same plane or planes parallel to each other, and the moving mechanism may translationally move the linear light source and the linear detector in a direction orthogonal to the same plane or the planes parallel to each other.

In addition, according to an aspect of one or more embodiments, in the confocal scanner, the linear light source and the linear detector may be disposed so as to have a positional relationship in which the plane determined from the longitudinal direction of the linear light source and the optical axis direction of the light emitted from the linear light source and the plane determined from the longitudinal direction of the linear detector and the optical axis direction of the light incident on the linear detector are the same plane and a positional relationship in which an optical axis of the linear light source and an optical axis of the linear detector intersect each other due to the splitting optical system.

In addition, according to an aspect of one or more embodiments, in the confocal scanner, the moving mechanism may integrally and translationally move the linear light source and the linear detector.

In addition, according to an aspect of one or more embodiments, the confocal scanner may further include a plurality of linear light sources and a plurality of linear detectors of which the numbers are the same, in which each of the linear light sources and each of the linear detectors which are in pairs may be disposed so as to have a positional relationship in which the linear light source and the linear detector correspond to each other.

In addition, according to an aspect of one or more embodiments, in the confocal scanner, each of the linear light sources and each of the linear detectors which are in pairs may be disposed so as to have a positional relationship in which a plane determined from a longitudinal direction of each of the linear light sources and an optical axis direction of the light emitted from the linear light source and a plane determined from a longitudinal direction of each of the linear detectors and an optical axis direction of light incident on the linear detector are the same plane or planes parallel to each other, and the moving mechanism may translationally move each of the linear light sources and each of the linear detectors which are in pairs in a direction orthogonal to the same plane or the planes parallel to each other.

In addition, according to an aspect of one or more embodiments, the confocal scanner may further include a plurality of either the linear light sources or the linear detectors, in which the linear light sources and the linear detectors may be disposed so as to selectively correspond to each other by relatively moving the linear light sources and the linear detectors.

In addition, according to an aspect of one or more embodiments, the confocal scanner may further include a plurality of linear light sources and one linear detector, in which one linear light source selected from the plurality of linear light sources and the one linear detector may be disposed so as to correspond to each other by relatively moving the linear light sources and the linear detector.

In addition, according to an aspect of one or more embodiments, in the confocal scanner, the linear light source may include a plurality of light sources and a slit, and the plurality of light sources and the slit may be disposed so that a wavelength of one light source selected from the plurality of light sources is a wavelength of light emitted from the linear light source by relatively moving the plurality of light sources with respect to the slit.

In addition, according to another aspect of one or more embodiments, there is a confocal microscope which may include a stage on which an observation target is placed, an objective lens, an imaging lens configured to form an image of the observation target which is incident through the objective lens, a linear light source configured to emit linear light with which the observation target is illuminated through the imaging lens and the objective lens, a linear detector including a linear detection unit that detects light emitted by the observation target and incident through the objective lens and the imaging lens for each line, and a moving mechanism configured to translationally move the linear light source and the linear detector with respect to the imaging lens, in which the linear light source and the linear detector are disposed so as to have a positional relationship in which the linear light source and the linear detector correspond to each other within an imaging surface at conjugate positions with respect to a focal plane of the microscope.

Meanwhile, since a light beam travels backward, a relationship between an object (observation target) and an image can be interchanged. That is, when an object is disposed at the position of an image, an image can be formed at the original position of the object using the same optical system. In this manner, it does not matter where the object is disposed, and thus two points being in an imaging relationship are said to be conjugated.

According to various embodiments, a confocal microscope image is obtained with a simple configuration.

Hereinafter, embodiments of the present invention will be described with reference to the accompanying drawings.

Meanwhile, in the drawings used in the description of the following embodiments, main portions will be mainly described for easy understanding of the description, and description will otherwise be omitted as appropriate. In addition, for convenience of description, main portions may be shown in an enlarged manner, and the dimensional ratios and the like of the respective components are not necessarily the same as the actual ones. Further, in the drawings, common components are denoted by the same reference numerals, and the description thereof will be omitted.

First Embodiment

First, a first embodiment of the present invention will be described.

(Configuration of Microscope System) FIG. 1 is a diagram showing an example of a configuration of a microscope system 1 according to a first embodiment. The microscope system 1 shown in the drawing includes a microscope 10 which is a microscope body, a confocal scanner 20 mounted on the microscope 10, a processing device 30 controlling the confocal scanner 20, and a monitor 40 attached to the processing device 30.

The microscope 10 includes a transparent illumination 11, a sample stage 12, an objective lens 13, a folding mirror 14, and an imaging lens 15. The transparent illumination 11 irradiates the sample stage 12 with light for observation, but when the transparent illumination is used in combination with the confocal scanner 20, linear illumination need not be used because linear light emitted from a linear light source 22 included in the confocal scanner 20 is used. Here, the transparent illumination 11 is shown in the microscope 10 as an example of a general-purpose microscope. A sample serving as an observation target T to be observed using the microscope 10 is mounted on the sample stage 12. The objective lens 13 enlarges an image of the observation target T placed on the sample stage 12. The folding mirror 14 guides parallel light of the image of the observation target T which is enlarged by the objective lens 13 to the imaging lens 15. An image of parallel light guided through the folding mirror 14 from the objective lens 13 is formed by the imaging lens 15. In the following description, an image of an observation target T which is formed by the imaging lens 15 is also referred to as an observation image. Meanwhile, in the present drawing, since a person does not observe the microscope 10 and the confocal scanner 20 is mounted, an eyepiece is not mounted on a portion behind the imaging lens 15.

The confocal scanner 20 includes the linear light source 22 emitting linear light, a dichroic mirror 21 guiding the light to the imaging lens 15 of the microscope 10, and a linear detector 23 detecting (imaging) light from the microscope 10 through the dichroic mirror 21 for each line. The dichroic mirror 21 is disposed between the imaging lens 15 and an image surface of the imaging lens 15. The confocal scanner 20 detects (images) light of an observation image in order for each line by scanning an observation target T in a direction orthogonal to a line direction (a longitudinal direction of linear light), and constructs a captured image of the entire observation image. Meanwhile, an alternating dotted-dashed line indicated by sign K in the present drawing indicates a light path (optical axis), and this is the same as in the other drawings.

Figure 2:
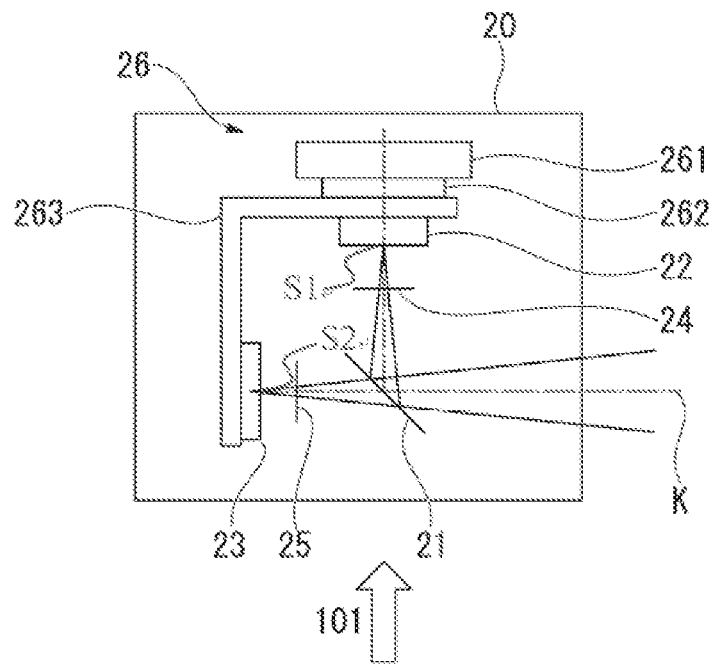
FIG. 2 is a detailed diagram of a confocal scanner according to the first embodiment.

FIG. 2 is a detailed diagram of the confocal scanner 20 viewed in a direction of an arrow 100 in FIG. 1. The confocal scanner 20 includes a dichroic mirror 21, an excitation filter 24, and a fluorescent light filter 25 which are disposed on a light path. The excitation filter 24 transmits only light having a specific wavelength. The dichroic mirror 21 is disposed as a splitting optical system, and a dichroic mirror having a characteristic of reflecting a wavelength of light (excited light) having passed through the excitation filter 24 and transmitting fluorescent light having a wavelength longer than that of the excited light is selected. The dichroic mirror 21 reflects the excited light in a direction of the imaging lens 15 of the microscope 10. The fluorescent light filter 25 transmits only fluorescent light in light having passed through the dichroic mirror 21. The fluorescent light having passed through the fluorescent light filter 25 arrives at the linear detector 23. Here, the linear light source 22 and the linear detector 23 are disposed at mutually corresponding positions within the imaging surfaces S1 and S2 of the imaging lens 15. For example, the linear light source 22 and the linear detector 23 split by the dichroic mirror 21 and are directly disposed on the imaging surfaces S1 and S2 of the imaging lens 15. In addition, the confocal scanner 20 includes a driving mechanism 26 (moving mechanism) capable of integrally and translationally moving the linear light source 22 and the linear detector 23 within the imaging surfaces S1 and S2. That is, the linear light source 22 and the linear detector 23 can translationally move on the imaging surfaces S1 and S2 of the microscope 10 (imaging lens 15) while maintaining a positional relationship of mutual correspondence.

Figure 3A:
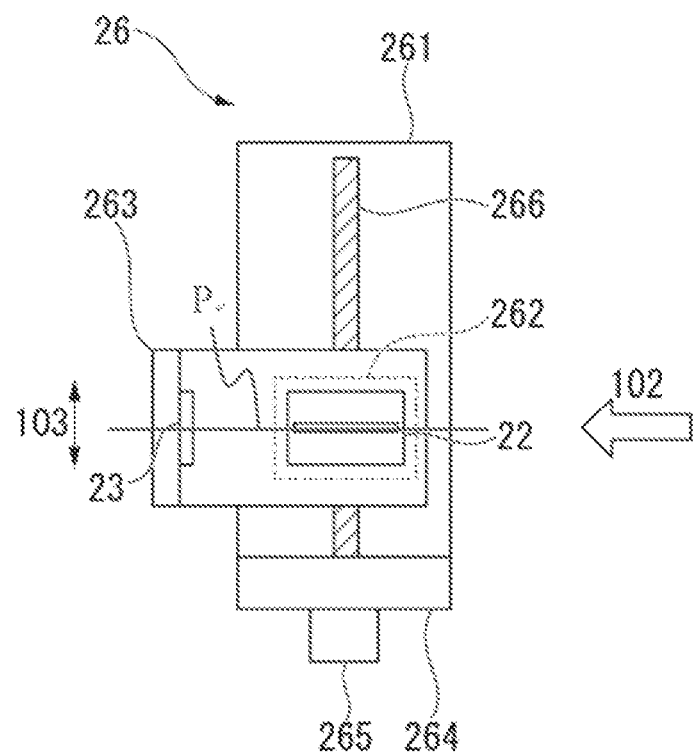
FIG. 3A is a diagram showing a detailed example of a driving mechanism according to the first embodiment.
Figure 3B:
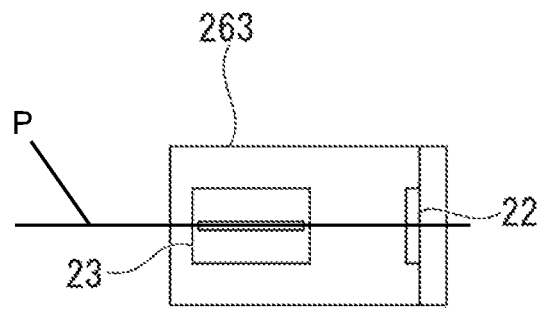
FIG. 3B is a diagram showing a detailed example of the driving mechanism according to the first embodiment.

FIGS. 3A and 3B are diagrams showing a detailed example of the driving mechanism 26. FIG. 3A is a diagram showing an example of the driving mechanism 26 viewed in a direction of an arrow 101 in FIG. 2. In addition, FIG. 3B is a diagram showing a portion of the driving mechanism 26 viewed in a direction of an arrow 102 in FIG. 3A. As shown in FIG. 2 and FIGS. 3A, and 3B, the driving mechanism 26 includes a linear guide 261, a stage portion 262, a connection member 263, a fixed block 264, a stepping motor 265, and a ball screw 266. The linear light source 22 and the linear detector 23 are fixed to the connection member 263 so as to have a positional relationship in which a plane P determined from a line direction (longitudinal direction) of the linear light source 22 and an optical axis direction of light emitted from the linear light source 22 and a plane P determined from a line direction (longitudinal direction) of the linear detector 23 and an optical axis direction of light incident on the linear detector 23 are the same plane and a positional relationship in which the respective optical axes thereof are orthogonal to each other. Meanwhile, the linear light source 22 and the linear detector 23 may be fixed to the connection member 263 so as to have a positional relationship in which a plane P determined from a line direction (longitudinal direction) of the linear light source 22 and an optical axis direction of light emitted from the linear light source 22 and a plane P determined from a line direction (longitudinal direction) of the linear detector 23 and an optical axis direction of light incident on the linear detector 23 are parallel to each other. In addition, the connection member 263 is fixed to the stage portion 262 of the linear guide 261 and can translationally move in a direction (scanning direction) of an arrow 103 in FIG. 3A.

The fixed block 264 is connected to the linear guide 261, and the stepping motor 265 is fixed to the fixed block 264. Further, the ball screw 266 is rotatably supported by the fixed block 264 using a bearing not shown in the drawing. The ball screw 266 is connected to the stepping motor 265 using a coupling not shown in the drawing. In addition, a ball nut not shown in the drawing is disposed inside the stage portion 262 and screwed to the ball screw 266. With this configuration, the linear light source 22 and the linear detector 23 can be integrally and translationally moved in directions (that is, scanning directions) orthogonal to the respective line directions (longitudinal directions) thereof by driving the stepping motor 265. Meanwhile, the directions orthogonal to the line directions (longitudinal directions) of the linear light source 22 and the linear detector 23 are equivalent to directions orthogonal to the above-described planes determined from the linear light source 22 and the linear detector 23. Meanwhile, the linear light source 22, the linear detector 23, the stepping motor 265, and the like are connected to the processing device 30 so as to be controllable by the processing device 30.

Figure 4A:
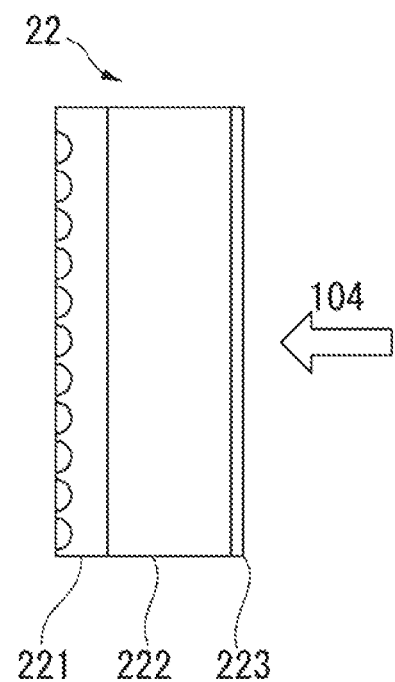
FIG. 4A is a side view showing a detailed example of a linear light source according to the first embodiment.
Figure 4B:
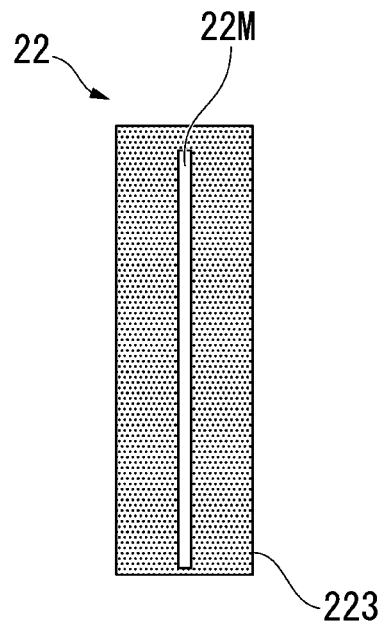
FIG. 4B is a side view showing a detailed example of the linear light source according to the first embodiment.

FIGS. 4A and 4B are diagrams showing a detailed example of the linear light source 22. FIG. 4A is a side view of the linear light source 22, and FIG. 4B is a front view of the linear light source 22 viewed in a direction of an arrow 104 in FIG. 4A. The linear light source 22 includes light emitting diode (LED) elements 221 arranged linearly, a light guide plate 222 disposed in front of the LED elements 221, and a slit 223 disposed in front of the light guide plate 222. Light emitted from the LED elements 221 is guided to a slit 223 by the light guide plate 222 and is emitted as linear light from a slit-like emission region 22M opening in the slit 223.

Figure 5A:
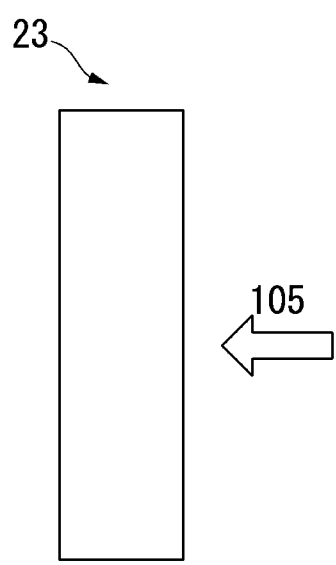
FIG. 5A is a diagram showing a detailed example of a linear detector according to the first embodiment.
Figure 5B:
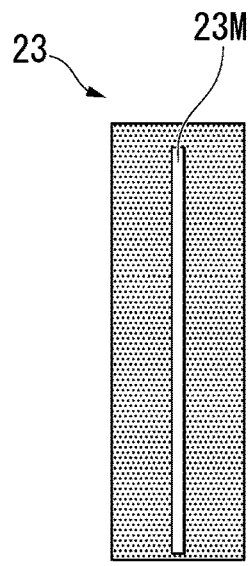
FIG. 5B is a diagram showing a detailed example of the linear detector according to the first embodiment.

FIGS. 5A and 5B are diagrams showing a detailed example of the linear detector 23. FIG. 5A is a side view of the linear detector 23, and FIG. 5B is a front view of the linear detector 23 viewed in a direction of an arrow 105 in FIG. 5A. For example, one column of complementary MOS (CMOS) elements may be arranged in a vertical direction in a detection region 23M of the linear detector 23, and light for the linear region detected (imaged).

In the microscope system 1, only a necessary wavelength of light emitted from the linear light source 22 of the confocal scanner 20 is transmitted by the excitation filter 24, and the transmitted light is reflected by the dichroic mirror 21 and directed to the microscope 10. The light is converted into parallel light by the imaging lens 15 disposed inside the microscope 10, and the direction of the light is changed by a right angle (in a direction of the objective lens 13) by the folding mirror 14, so that the light is focused and projected onto a sample to be observed, not shown in the drawing, on the sample stage 12 by the objective lens 13. Here, since illumination light from the confocal scanner 20 is linear, the light projected onto the sample to be observed is also linear. Fluorescent light emitted from the sample returns to the same light path in the opposite direction and is incident on the objective lens 13, the direction of the fluorescent light is changed by the folding mirror 14, and the fluorescent light is imaged by the imaging lens 15. The fluorescent light from the sample passes through the dichroic mirror 21, only a necessary wavelength of the fluorescent light passes through the fluorescent light filter 25, and the fluorescent light is imaged and projected in the detection region 23M of the linear detector 23. The linear light source 22 and the linear detector 23 are disposed so as to have a positional relationship in which the linear light source and the linear detector correspond to each other within the imaging surfaces S1 and S2 at conjugate positions with respect to a focal plane of the microscope. For this reason, hardly any fluorescent light other than that in the region of the linear illumination light projected onto the sample is detected by the linear detector 23.

Referring back to FIG. 1, the processing device 30 is a computer device used by a user, and a personal computer (PC) a tablet PC, a mobile phone such as a smartphone or a feature phone, a portable information terminal (personal digital assistant: PDA), can the like can be applied.

For example, the processing device 30 controls the linear light source 22, the linear detector 23, and the stepping motor 265 of the confocal scanner 20 to perform control for detecting (capturing) an image of an observation target for each line while integrally and translationally moving the linear light source 22 and the linear detector 23 in a scanning direction. In addition, the processing device 30 constructs a captured image of the observation image on the basis of the image detected (captured) for each line.

(Operation of Line Scanning Process)

Next, an operation of a line scanning process in which the processing device 30 captures an image of an observation image using the microscope 10 by translationally moving the linear light source 22 and the linear detector 23 of the confocal scanner 20 in a scanning direction will be described.

Figure 6:
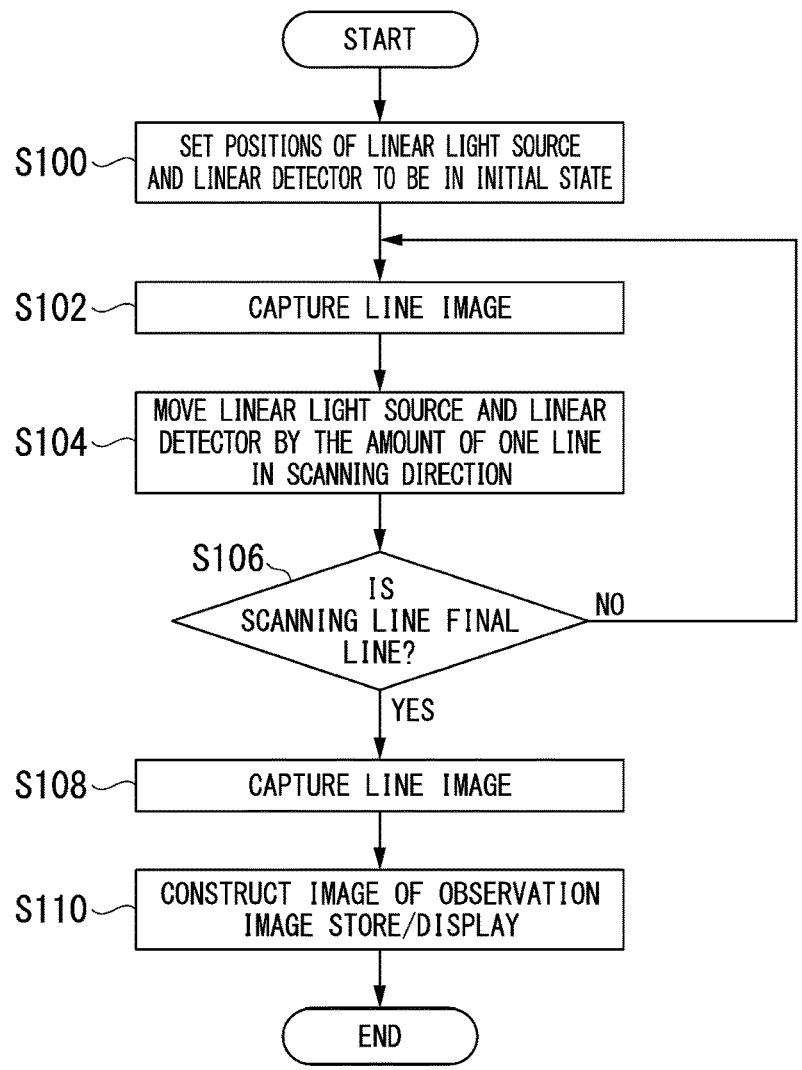
FIG. 6 is a flowchart showing an example of a line scanning process according to the first embodiment.

FIG. 6 is a flowchart showing an example of a line scanning process according to the first embodiment.

Step S100: First, the processing device 30 sets positions of the linear light source 22 and the linear detector 23 of the confocal scanner 20 to be in an initial state, and the operation proceeds to the process of step S102. The initial state refers to, for example, a state where a starting position (one end of a scanning region) when line scanning of a sample to be observed is performed is set as a detection target. In this case, as described above, light emitted from the linear light source 22 of the confocal scanner 20 passes through the excitation filter 24, is reflected by the dichroic mirror 21, and is directed to the microscope 10. The light incident on the microscope 10 from the dichroic mirror 21 is focused and projected onto a sample to be observed, not shown in the drawing, on the sample stage 12 through the imaging lens 15, the folding mirror 14, and the objective lens 13 provided inside the microscope 10. In addition, fluorescent light emitted from the sample returns to the same light path in the opposite direction and is directed to the confocal scanner 20 through the objective lens 13, the folding mirror 14, and the imaging lens 15. The light having passed through the imaging lens 15 is imaged and projected in the detection region 23M of the linear detector 23 through the dichroic mirror 21 and the fluorescent light filter 25.

Step S102: The processing device 30 captures a transmission image having passed through the dichroic mirror 21 and the fluorescent light filter 25 (an image of a linear observation image, also referred to as a "line image") in the linear detector 23 of the confocal scanner 20. In addition, the operation proceeds to the process of step S104.

Step S104: The processing device 30 drives the stepping motor 265 such that the linear light source 22 and the linear detector 23 are translationally moved by the amount of one line in directions (scanning directions) orthogonal to the line directions (longitudinal directions) thereof. The amount of one line refers to an amount of movement which is set in advance on the basis of line widths (widths in a lateral direction) of the emission region 22M of the linear light source 22 and the detection region 23M of the linear detector 23. Thereby, linear light projected onto the sample to be observed is moved by the amount of one line in the scanning direction, and the line image detected by the linear detector 23 is also moved by the amount of one line in the scanning direction. In addition, the operation then proceeds to the process of step S106.

Step S106: The processing device 30 determines whether or not a scanning line is a final line. When the processing device 30 determines that a scanning line is not a final line (NO), the processing device returns to the process of step S102 to cause the linear detector 23 of the confocal scanner 20 to capture a line image and further moves the linear light source 22 and the linear detector 23 by the amount of one line in the scanning direction through the process of step S104. On the other hand, in a case where the processing device 30 determines that the scanning line is a final line in step S106 (YES), the operation proceeds to the process of step S108.

Step S108: The processing device 30 causes the linear detector 23 of the confocal scanner 20 to capture a line image (a line image of the final line) having passed through the dichroic mirror 21 and the fluorescent light filter 25. In addition, the operation proceeds to the process of step S110.

Step S110: A track of linear light with which scanning is performed to the final line is a plane orthogonal to an optical axis. The processing device 30 constructs an image of an observation image corresponding to a scanned surface from positional information for each line of the stepping motor 265 of which the driving is controlled and a line image for each line which is captured by the linear detector 23. The image is a confocal microscope image hardly including fluorescent light from portions other than the vicinity of a focal plane. In addition, the processing device 30 displays the constructed image of the observation image on the monitor 40 and stores the image in a storage device not shown in the drawing. Meanwhile, the storage device may be built into the processing device 30 or may be connected to the outside.

Meanwhile, during the above-described process, the sample stage 12 may be appropriately driven to select a desired place in the sample to be observed or to perform focusing on the sample and positioning of an observation surface in a depth direction. In addition, the transparent illumination 11 may be turned on as necessary to translationally move the linear detector 23 and capture a line image.

In addition, the processing device 30 may acquire a line image of each line from the confocal scanner 20 whenever scanning of each line is performed or may collectively acquire line images from the confocal scanner 20 after scanning to the final line is terminated.

In addition, the processing device 30 may stop the linear light source 22 and the linear detector 23 for each line and then capture each line image during the line scanning process and may capture a line image of each line while moving the linear light source 22 and the linear detector 23 without stopping the linear light source 22 and the linear detector 23 for each line.

In addition, as a light source of the linear light source 22, LED elements 221 of one color may be linearly arranged, or LED elements 221 of a plurality of colors may be regularly arranged. In a case where the LED elements 221 of a plurality of colors are regularly arranged, dichroic mirrors 21, excitation filters 24, and fluorescent light filters 25 corresponding to a plurality of colors may be selected. In this case, it is preferable that LED elements 221 of one color be turned on to sequentially capture line images.

Further, in the present embodiment, an example in which the linear light source 22 includes the LED elements 221, the light guide plate 222 disposed in front of the LED elements 221, and the slit 223 disposed in front of the light guide plate 222 has been described, but the invention is not limited thereto. For example, another optical system may be used instead of the light guide plate 222, and at least an LED element and a slit may be included without using an optical system such as a light guide plate.

Further, in the present embodiment, an example in which CMOS elements of one column are disposed in the detection region 23M has been described for the linear detector 23, but the invention is not limited thereto. For example, CMOS elements of a plurality of columns may be disposed, and a linear charge coupled device (CCD) may be disposed in the detection region 23M. In addition, a CMOS element or a CCD capable of capturing a two-dimensional image may be disposed in the linear detector 23 to read detection results (imaging results) of the CMOS element or the CCD of a column corresponding to a scanning position of linear illumination light.

Further, in the present embodiment, the dichroic mirror 21 reflects excited light and transmits fluorescent light, but the invention is not limited thereto. For example, the disposition of the linear light source 22 and the excitation filter 24 and the disposition of the linear detector 23 and the fluorescent light filter 25 may be interchanged using a dichroic mirror transmitting excited light and reflecting fluorescent light.

As described above, the confocal scanner 20 mounted on the microscope 10 according to the present embodiment includes the linear light source 22 emitting linear light, the linear detector 23 including a CMOS element (detection unit) detecting incident light for each line and disposed linearly, and the driving mechanism 26 (moving mechanism) translationally moving the linear light source 22 and the linear detector 23 with respect to the microscope 10. The linear light source 22 and the linear detector 23 are disposed so as to have a positional relationship in which the linear light source and the linear detector correspond to each other within imaging surfaces S1 and S2 at conjugate positions with respect to a focal plane of the microscope 10.

In this manner, the confocal scanner 20 translationally moves the linear light source 22 and the linear detector 23 while maintaining a positional relationship in which the linear light source and the linear detector correspond to each other within an imaging surface of the microscope 10, and thus it is possible to capture a confocal microscope image using a general-purpose microscope such as the microscope 10 without needing to use a special microscope. Therefore, according to the present embodiment, it is possible to obtain a confocal microscope image with a simple configuration and reduce installation costs. In addition, it is possible to make an optical system smaller than when a scanning mirror as disclosed in Japanese Patent No. 4905356 is used.

For example, the linear light source 22 and the linear detector 23 are disposed so as to have a positional relationship in which a plane determined from a line direction (longitudinal direction) of the linear light source 22 and an optical axis direction of light emitted from the linear light source 22 and a plane determined from a line direction (longitudinal direction) of the linear detector 23 and an optical axis direction of light incident on the linear detector 23 are the same plane or planes parallel to each other. In addition, the driving mechanism 26 (moving mechanism) can translationally move the linear light source 22 and the linear detector 23 in a direction (scanning direction) orthogonal to the above-described same plane or planes parallel to each other.

Thereby, the confocal scanner 20 can associate the linear light source 22 and the linear detector 23 with each other using one driving mechanism 26, which leads to a simple configuration. For example, in the configuration shown in FIG. 3, line directions of the linear light source 22 and the linear detector 23 can also be set to be parallel to a scanning direction. However, in this case, a moving direction of the linear light source 22 and a moving direction of the linear detector 23 are different from each other during scanning, and thus the same driving mechanism cannot be used.

In addition, the driving mechanism 26 (moving mechanism) can integrally and translationally move the linear light source 22 and the linear detector 23.

Thereby, the confocal scanner 20 can associate the linear light source 22 and the linear detector 23 with each other using the same driving mechanism, and thus synchronization required when a plurality of driving mechanisms are used becomes unnecessary, which leads to a simple configuration. In addition, since a positional relationship between the linear light source 22 and the linear detector 23 is fixed through integration, it is possible to more easily secure accuracy than when the linear light source 22 and the linear detector 23 are driven separately.

Meanwhile, in the present embodiment, an example in which the linear light source 22 and the linear detector 23 are integrally and translationally moved has been described, but the linear light source 22 and the linear detector 23 may be separately moved translationally and may be individually synchronized and moved.

In addition, for example, the linear light source 22 and the linear detector 23 are disposed so as to have a positional relationship in which a plane determined from a line direction (longitudinal direction) of the linear light source 22 and an optical axis direction of light emitted from the linear light source 22 and a plane determined from a line direction (longitudinal direction) of the linear detector 23 and an optical axis direction of light incident on the linear detector 23 are the same plane and a positional relationship in which a central optical axis of the linear light source 22 and a central optical axis of the linear detector 23 intersect each other by the dichroic mirror 21 (splitting optical system).

A change in the optical axis direction is minimized by disposing the linear light source 22 and the linear detector 23 in this manner, and thus the optical system can be made small and configured in a small space.

Second Embodiment

Next, a second embodiment of the present invention will be described.

Figure 7A:
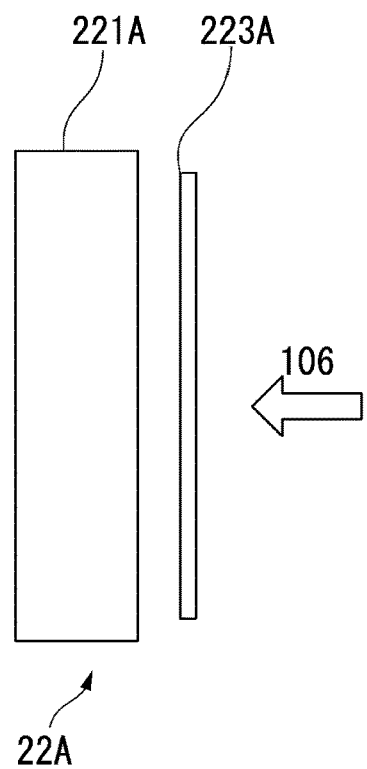
FIG. 7A is a diagram showing a detailed example of a linear light source according to a second embodiment.
Figure 7B:
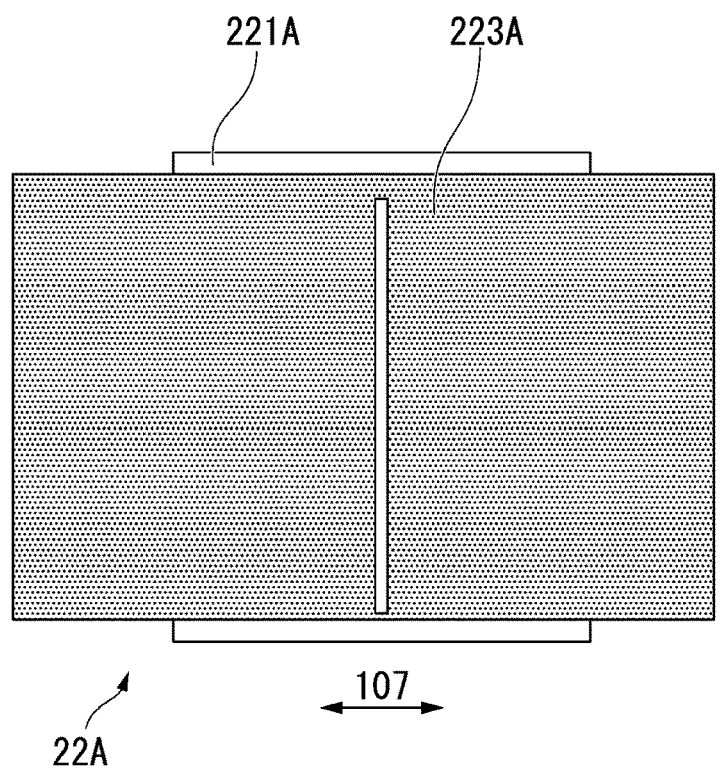
FIG. 7B is a diagram showing a detailed example of the linear light source according to the second embodiment.

The present embodiment is a modification example of the linear light source 22 (see FIGS. 4A and 4B) described in the first embodiment. In the first embodiment, an example of the linear light source 22 in which the LED elements 221 are linearly arranged has been described, but a linear light source may be configured using a surface emitting type light source. FIGS. 7A and 7B are diagrams showing a detailed example of a linear light source 22A according to the second embodiment. FIG. 7A is a side view of the linear light source 22A, and FIG. 7B is a front view of the linear light source 22A viewed in a direction of an arrow 106 of FIG. 7A. The linear light source 22A shown in the drawing includes a surface emitting LED 221A as a light source and a slit 223A disposed to cover a light emitting surface of the surface emitting LED 221A. Light emitted from the surface emitting LED 221A is linearly emitted from a slit (emission region 22M) opening in the slit 223A. For example, in the present embodiment, in a case where the linear light source 22A is translationally moved in a direction (scanning direction) of an arrow 107, only the slit 223A may be translationally moved in the direction (scanning direction) of the arrow 107 without moving the entire linear light source 22A.

In this manner, also in a case where a linear light source is configured using a surface emitting type light source, a confocal microscope image is obtained with a simple configuration similar to the first embodiment, and it is possible to make an optical system small and reduce introduction costs.

Third Embodiment

Next, a third embodiment of the present invention will be described.

The present embodiment is a modification example of the linear detector 23 (see FIGS. 5A and 5B) described in the first embodiment.

Figure 8A:
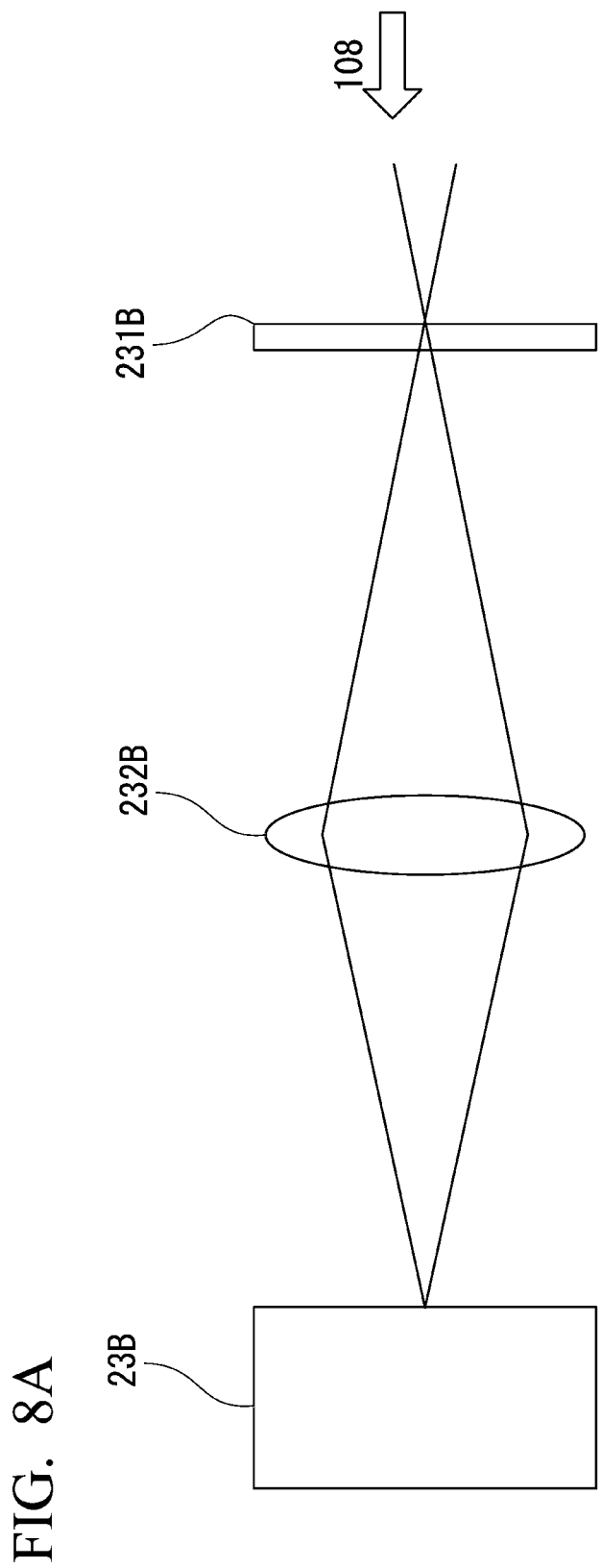
FIG. 8A is a side view showing a detailed example of a linear detector according to a third embodiment.
Figure 8B:
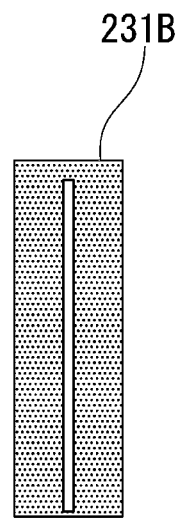
FIG. 8B is a side view showing a detailed example of the linear detector according to the third embodiment.

FIGS. 8A and 8B are diagrams showing a detailed example of a linear detector 23B according to a third embodiment. FIG. 8A is a side view of the linear detector 23B, and FIG. 8B is a front view of the linear detector 23B viewed in a direction of an arrow 108 of FIG. 8A. In the present embodiment, light detected by the linear detector 23B passes through a slit 231B and is imaged by the linear detector 23B through a relay lens 232B. For example, in the linear detector 23B, a linear CMOS element, a linear CCD, or a CMOS element or a CCD capable of capturing a two-dimensional image is disposed, a CMOS element capable of capturing a two-dimensional image is disposed, and a line image formed through the slit 231B and the relay lens 232B is detected (captured).

Also in a case where the linear detector 23B is configured as described above, a confocal microscope image is obtained with a simple configuration similar to the first embodiment, and it is possible to make an optical system small and reduce introduction costs. Further, in the present embodiment, it is also possible to easily change the width of the slit 231B.

Fourth Embodiment

Next, a fourth embodiment of the present invention will be described.

Figure 9A:
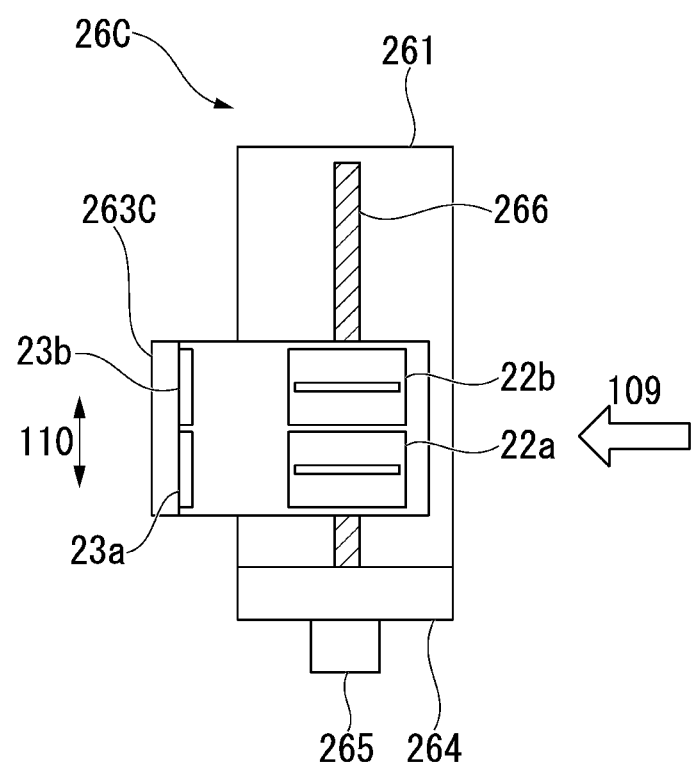
FIG. 9A is a diagram showing a detailed example of a driving mechanism according to a fourth embodiment.
Figure 9B:
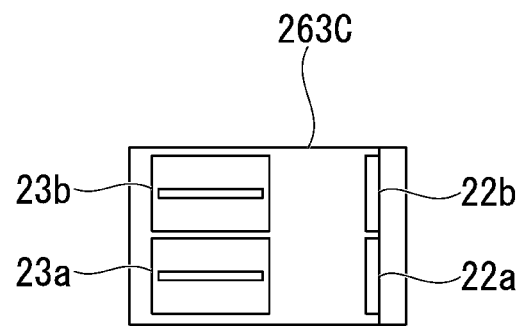
FIG. 9B is a diagram showing a detailed example of the driving mechanism according to the fourth embodiment.

The present embodiment is a configuration example in which a plurality of linear light sources 22 and a plurality of linear detectors 23 described in the first embodiment are provided, and is equivalent to a modification example of the driving mechanism 26 shown in FIG. 3. FIGS. 9A and 9B are diagrams showing a detailed example of a driving mechanism 26C according to the fourth embodiment. FIG. 9A is a diagram showing an example of the driving mechanism 26C when viewed in the same direction as in FIG. 3A. FIG. 9B is a diagram showing a portion of the driving mechanism 26C viewed in a direction of an arrow 109 of FIG. 9A. The driving mechanism 26C is different from that in the first embodiment in that a connection member 263C is provided with two linear light sources 22a and 22b and two linear detectors 23a and 23b. The linear light source 22a and the linear detector 23a are paired and disposed so as to have a positional relationship in which the linear light source and the linear detector correspond to each other within an imaging surface of a microscope 10. In addition, the linear light source 22b and the linear detector 23b are paired and disposed so as to have a positional relationship in which the linear light source and the linear detector correspond to each other within an imaging surface of the microscope 10.

In addition, the connection member 263C is fixed to a stage portion 262 of a linear guide 261 and can be translationally moved in a direction (scanning direction) of an arrow 110 in FIG. 9A. That is, two linear light sources 22a and 22b and two linear detectors 23a and 23b are disposed so as to be lined up in the parallel moving direction. Specifically, each of the linear light sources and each of the linear detectors which are in pairs among the two linear light sources 22a and 22b and the two linear detectors 23a and 23b are disposed so as to have a positional relationship in which a plane determined from a line direction (longitudinal direction) of each of the linear light sources and an optical axis direction of light emitted from the linear light source and a plane determined from a line direction (longitudinal direction) of each of the linear detectors and an optical axis direction of light incident on the linear detector are the same plane.

In addition, here, LED elements having different wavelengths are respectively mounted to the two linear light sources 22a and 22b, and excitation filters, not shown in the drawing, which correspond to the respective wavelengths are provided on the entire surfaces thereof. In addition, fluorescent light filters, not shown in the drawing, which correspond to fluorescent light wavelengths are respectively provided in the corresponding linear detectors 23a and 23b.

In the above-described configuration, the processing device 30 can translationally move the two linear light sources 22a and 22b and the two linear detectors 23a and 23b in a scanning direction by driving a stepping motor 265 and can sequentially capture line images having two wavelengths in parallel. Thereby, in the present embodiment, it is possible to capture line images of two colors at a higher speed, in addition to the same effects as in the first embodiment.

Meanwhile, each of the linear light sources and each of the linear detectors which are in pairs among the two linear light sources 22a and 22b and the two linear detectors 23a and 23b may be disposed so as to have a positional relationship in which a plane determined from a line direction (longitudinal direction) of each of the linear light sources and an optical axis direction of light emitted from the linear light source and a plane determined from a line direction (longitudinal direction) of each of the linear detectors and an optical axis direction of light incident on the linear detector are planes parallel to each other.

Fifth Embodiment

Next, a fifth embodiment of the present invention will be described.

Figure 10:
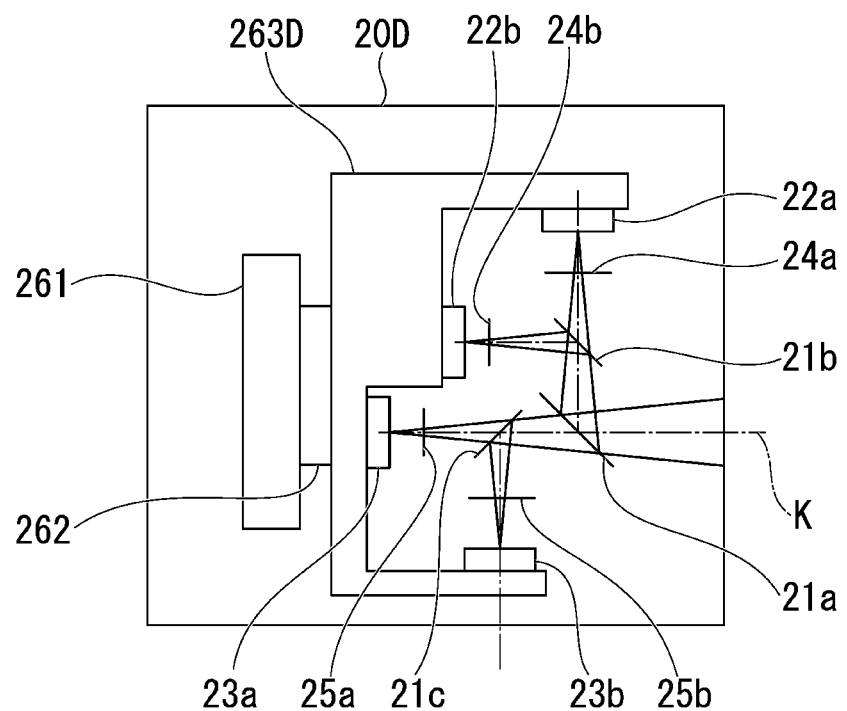
FIG. 10 is a diagram showing a configuration example of a confocal scanner according to a fifth embodiment.

In the present embodiment, a plurality of linear light sources 22 and a plurality of linear detectors 23 are provided similar to the fourth embodiment, but the dispositions thereof are different from each other. FIG. 10 is a diagram showing a configuration example of a confocal scanner 20D according to the fifth embodiment. FIG. 10 shows a modification example of the confocal scanner 20 shown in FIG. 2, and corresponding portions will be denoted by the same reference numerals and will not be described.

LED elements having different wavelengths are respectively mounted to two linear light sources 22a and 22b, and excitation filters 24a and 24b according to the wavelengths are respectively disposed in front of the linear light sources. Further, one light beam passes through a dichroic mirror 21b for excitation, and the other light beam is reflected by the dichroic mirror 21b for excitation. Thereby, the two light beams overlap each other. In addition, fluorescent light filters 25a and 25b according to wavelengths of which two linear detectors 23a and 23b take charge are respectively disposed in front of the linear detectors. Further, one light beam passes through a dichroic mirror 21c for fluorescent light, and the other light beam is reflected by the dichroic mirror 21c for fluorescent light. Thereby, the two light beams overlap each other. The dichroic mirror 21a reflects wavelengths of excited light having passed through the dichroic mirror 21b for excitation and reflected excited light and transmits fluorescent light from an imaging lens 15 of a microscope 10.

The linear light source 22a and the linear detector 23a are disposed so as to have a positional relationship in which the linear light source and the linear detector correspond to each other within an imaging surface of the microscope 10. In addition, the linear light source 22b and the linear detector 23b are disposed so as to have a positional relationship in which the linear light source and the linear detector correspond to each other within an imaging surface of the microscope 10. Here, each of the two linear light sources and each of the two linear detectors are fixed to a connection member 263D so as to have a positional relationship in which a plane determined from a line direction (longitudinal direction) of each of the linear light sources and an optical axis direction of light emitted from the linear light source and a plane determined from a line direction (longitudinal direction) of each of the linear detectors and an optical axis direction of light incident on the linear detector are the same plane.

Meanwhile, the invention is not limited thereto, and the linear light source 22a, the linear detector 23a, the linear light source 22b, and the linear detector 23b may be disposed so as to deviate in a direction (scanning direction) perpendicular to the above-described same plane. In this case, light beams of wavelengths are not mixed with each other, and thus it is possible to perform measurement with a higher sensitivity. In short, any disposition may be adopted as long as the linear light source 22a and the linear detector 23a have a positional relationship in which within the linear light source and the linear detector correspond to each other an imaging surface of the microscope 10 and the linear light source 22b and the linear detector 23b have a positional relationship in which the linear light source and the linear detector correspond to each other within an imaging surface of the microscope 10.

In the above-described configuration, the processing device 30 can translationally move the two linear light sources 22a and 22b and the two linear detectors 23a and 23b in a scanning direction by driving a stepping motor 265 and can sequentially capture line images having two wavelengths in parallel. Thereby, in the present embodiment, it is possible to capture line images of two colors at a higher speed, in addition to the same effects as in the first embodiment.

Meanwhile, each of the linear light sources and each of the linear detectors which are in pairs among the linear light sources 22a and 22b and the two linear detectors 23a and 23b may be disposed so as to have a positional relationship in which a plane determined from a line direction (longitudinal direction) of each of the linear light sources and an optical axis direction of light emitted from the linear light source and a plane determined from a line direction (longitudinal direction) of each of the linear detectors and an optical axis direction of light incident on the linear detector are planes parallel to each other.

Sixth Embodiment

Next, a sixth embodiment of the present invention will be described.

The present embodiment is a modification example of the fourth embodiment. In the fourth embodiment, a plurality of linear light sources 22 and a plurality of linear detectors 23 are provided. However, in the present embodiment, a configuration in which either the linear light source 22 or the linear detector 23 is provided in plural will be described.

In general, it may be difficult to provide a plurality of linear detectors 23 due to its high price. Further, in a case where the linear light sources 22 are configured in plural colors, it may be preferable to switch the plurality of light sources. Consequently, a configuration example in which one linear detector 23 corresponds to the plurality of linear light sources 22 will be described with reference to FIGS. 11A and 11B.

Figure 11A:
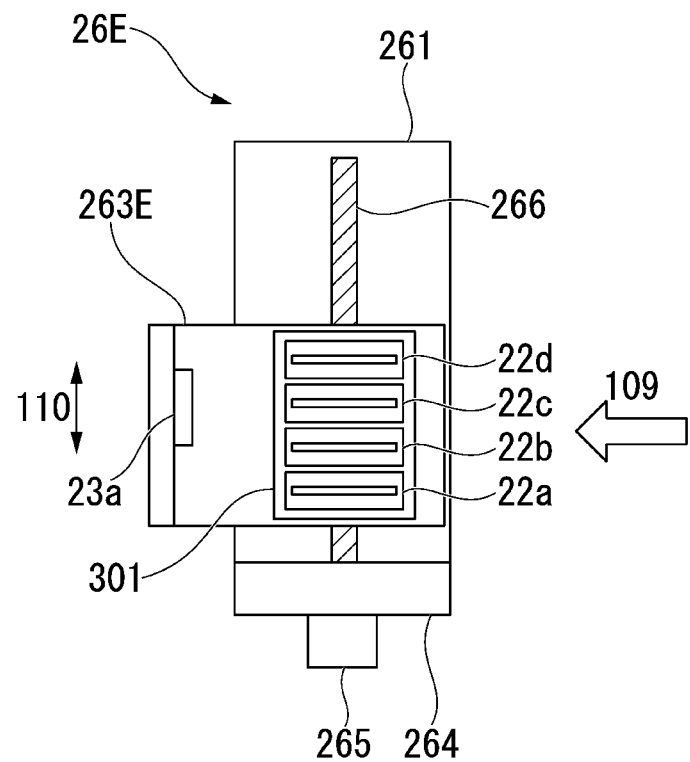
FIG. 11A is a diagram showing an example of a driving mechanism according to a sixth embodiment.
Figure 11B:
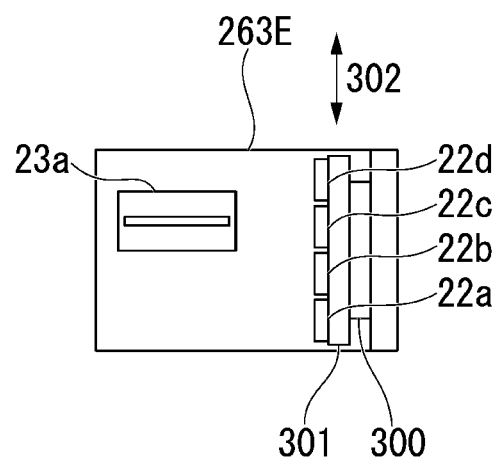
FIG. 11B is a diagram showing an example of the driving mechanism according to the sixth embodiment.

FIGS. 11A and 11B are diagrams showing an example of a driving mechanism 26E according to the sixth embodiment. FIG. 11A is a diagram showing an example of the driving mechanism 26E when viewed in the same direction as in FIG. 9A. FIG. 11B is a diagram showing a portion of the driving mechanism 26E viewed in a direction of an arrow 109 in FIG. 11A. In the example shown in the drawing, one linear detector 23a is disposed in a connection member 263E of the driving mechanism 26E. Further, a stage portion 301 is provided in the connection member 263E through a linear guide 300, and four linear light sources 22a, 22b, 22c, and 22d are disposed in the stage portion 301. Here, the stage portion 301 is movable in a direction of an arrow 302 (a direction orthogonal to the longitudinal directions of the linear detector 23a and the linear light sources 22a, 22b, 22c, and 22d) using an actuator not shown in the drawing. The four linear light sources 22a, 22b, 22c, and 22d move with respect to one linear detector 23a by moving the stage portion 301 in the direction of the arrow 302. That is, the four linear light sources 22a, 22b, 22c, and 22d and the linear detector 23a relatively move, and one selected from the four linear light sources 22a, 22b, 22c, and 22d and the linear detector 23a have a positional relationship in which the linear light source and the linear detector correspond to each other within an imaging surface of the microscope 10.

In the example shown in the drawing, the linear light source 22c is selected, and the linear light source 22c and the linear detector 23a have a positional relationship in which the linear light source and the linear detector correspond to each other. In this state, a processing device 30 can drive a stepping motor 265 to detect (capture) an image of an observation target for each line while integrally and translationally moving the entire optical system mounted on the connection member 263E in a scanning direction. Meanwhile, in a case where excitation using any one of the other linear light sources 22a, 22b, and 22d is required, a desired linear light source is moved to a corresponding position by moving the stage portion 301 at any time.

Meanwhile, in the example shown in the drawing, an example in which one linear detector 23 (for example, 23a) and the plurality of linear light sources 22 (for example, 22a, 22b, 22c, and 22d) are provided has been described, but a plurality of linear detectors 23 and one linear light source 22 may be provided. In this case, one linear detector 23 selected from the plurality of linear detectors 23 and one linear light source 22 can have a positional relationship in which the linear detector and the linear light source correspond to each other within an imaging surface of the microscope 10 by moving the plurality of linear detectors 23 instead of moving the plurality of linear light sources 22 as shown in FIGS. 11A and 11B.

In this manner, in the present embodiment, either the linear light source 22 or the linear detector 23 is provided in plural, and the linear light source 22 and the linear detector 23 are relatively moved so that the linear light source 22 and the linear detector 23 are disposed so as to be capable of selectively corresponding to each other. For example, in a configuration in which one linear detector 23 and a plurality of linear light sources 22 are provided, one linear detector 23 and a plurality of linear light sources 22 are relatively moved so that one linear light source 22 selected from the plurality of linear light sources 22 and one linear detector 23 are disposed so as to be capable of corresponding to each other. Thereby, it is possible to capture line images having a plurality of wavelengths by selectively using the linear light sources 22 having a plurality of wavelengths while more reducing costs than when a plurality of linear detectors 23 are provided.

Seventh Embodiment

Next, a seventh embodiment of the present invention will be described.

The present embodiment is a configuration example in which one linear detector 23 corresponds to a plurality of linear light sources 22, similar to the sixth embodiment. However, the present embodiment is different from the sixth embodiment in that one linear detector 23 is moved without moving a plurality of linear light sources 22.

Figure 12A:
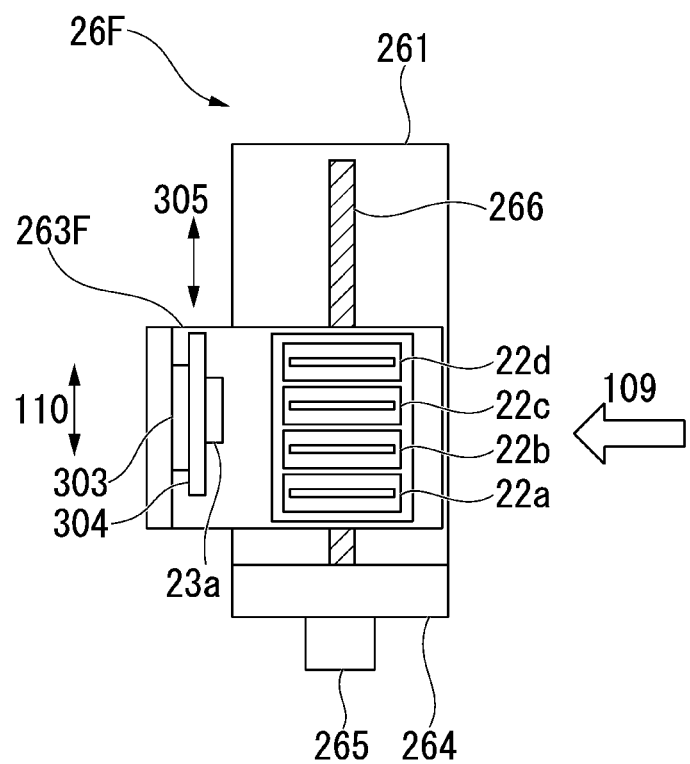
FIG. 12A is a diagram showing an example of a driving mechanism according to a seventh embodiment.
Figure 12B:
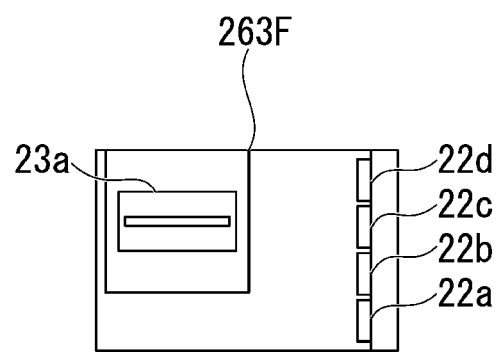
FIG. 12B is a diagram showing an example of the driving mechanism according to the seventh embodiment.

FIGS. 12A and 12B are diagrams showing an example of a driving mechanism 26F according to the seventh embodiment. FIG. 12A is a diagram showing an example of the driving mechanism 26F when viewed in the same direction as in FIG. 11A. FIG. 12B is a diagram showing a portion of the driving mechanism 26F viewed in a direction of an arrow 109 in FIG. 12A. In the example shown in the drawing, four linear light sources 22a, 22b, 22c, and 22d are disposed in a connection member 263F of the driving mechanism 26F. Further, a stage portion 304 is provided in the connection member 263F through a linear guide 303, and one linear detector 23a is disposed in the stage portion 304. Here, the stage portion 304 is movable in a direction of an arrow 305 (a direction orthogonal to the longitudinal directions of the linear detector 23a and the linear light sources 22a, 22b, 22c, and 22d) using an actuator not shown in the drawing. One linear detector 23a moves with respect to the four linear light sources 22a, 22b, 22c, and 22d by moving the stage portion 304 in the direction of the arrow 305. That is, the four linear light sources 22a, 22b, 22c, and 22d and the linear detector 23a relatively move, and one selected from the four linear light sources 22a, 22b, 22c, and 22d and the linear detector 23a have a positional relationship in which the linear light source and the linear detector correspond to each other within an imaging surface of a microscope 10.

In the example shown in the drawing, the linear light source 22c is selected, and the linear light source 22c and the linear detector 23a have a positional relationship in which the linear light source and the linear detector correspond to each other. In this state, a processing device 30 can drive a stepping motor 265 to detect (capture) an image of an observation target for each line while integrally and translationally moving the entire optical system mounted on the connection member 263E in a scanning direction. Meanwhile, in a case where excitation using any one of the other linear light sources 22a, 22b, and 22d is required, a desired linear light source is moved to a corresponding position by moving a stage portion 301 at any time.

Meanwhile, in the example shown in the drawing, an example in which one linear detector 23 (for example, 23a) and the plurality of linear light sources 22 (for example, 22a, 22b, 22c, and 22d) are provided has been described, but a plurality of linear detectors 23 and one linear light source 22 may be provided. In this case, one linear detector 23 selected from the plurality of linear detectors 23 and one linear light source 22 can have a positional relationship in which the linear detector and the linear light source correspond to each other within an imaging surface of the microscope 10 by moving one linear light source 22 instead of moving one linear detector 23 (for example, 23a).

In this manner, also in the present embodiment, similarly to the sixth embodiment, either the linear light source 22 or the linear detector 23 is provided in plural, and the linear light source 22 and the linear detector 23 are relatively moved so that the linear light source 22 and the linear detector 23 are disposed so as to be capable of selectively corresponding to each other. Thereby, for example, in a case where one linear detector 23 and a plurality of linear light sources 22 are provided, it is possible to capture line images having a plurality of wavelengths by selectively using the linear light sources 22 having a plurality of wavelengths while more reducing costs than when a plurality of linear detectors 23 are provided.

Eighth Embodiment

Next, an eighth embodiment of the present invention will be described. In the above-described embodiment, the linear light source 22 and the linear detector 23 integrated with each other are translationally moved using one driving mechanism. However, in the present embodiment, an example in which a linear light source 22 and a linear detector 23 are separated from each other and respectively translationally moved using two driving mechanisms will be described.

Figure 13:
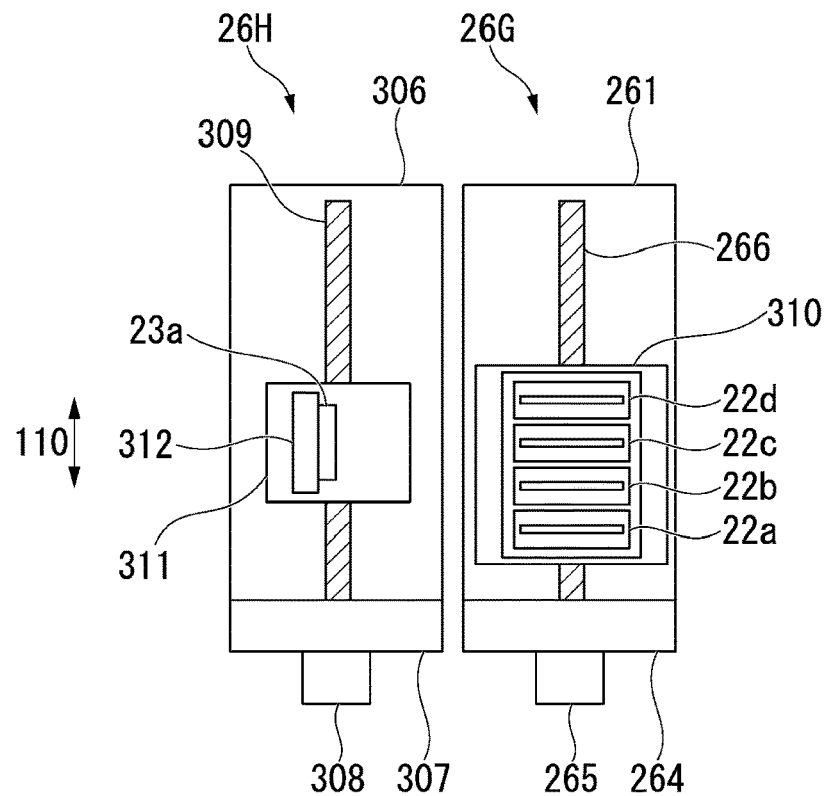
FIG. 13 is a diagram showing an example of two driving mechanisms according to an eighth embodiment.

FIG. 13 is a diagram showing an example of two driving mechanisms according to an eighth embodiment. This drawing is a diagram showing an example of two driving mechanisms 26G and 26H when viewed in the same direction as in FIG. 11A. The driving mechanism 26G includes a linear guide 261, a stage portion 310, a fixed block 264, a stepping motor 265, and a ball screw 266. The connection member 263E shown in FIGS. 11A and 11B is not provided, and four linear light sources 22a, 22b, 22c, and 22d are disposed in the stage portion 310. The driving mechanism 26H basically includes a, linear guide 306, a stage portion 311, a fixed block 307, a stepping motor 308, and a ball screw 308, similar to the driving mechanism 26G. In addition, a linear detector 23a is disposed in the stage portion 311 through a mounting base 312 so as to face in the same direction as that in the example shown in FIGS. 11A and BIB.

In the example shown in the drawing, the linear light source 22c is selected, and the linear light source 22c and the linear detector 23a have a positional relationship in which the linear light source and the linear detector correspond to each other. In a case where excitation using any one of the other linear light sources 22a, 22b, and 22d is required, a processing device 30 can drive the stepping motor 265 or the stepping motor 308 to relatively move the plurality of linear light sources 22 and the linear detector 23a and make a desired linear light source 22 correspond to the linear detector 23a. In addition, when scanning for imaging is performed, the processing device 30 drives two of the stepping motors 265 and the stepping motor 308 in synchronization with each other to translationally move the linear light source 22 and the linear detector 23a in a scanning direction while maintaining a positional relationship therebetween.

Thereby, it is possible to capture line images having a plurality of wavelengths by selectively using the linear light sources 22 having a plurality of wavelengths while more reducing costs than when a plurality of linear detectors 23 are provided. In addition, the linear light source 22 and the linear detector 23 are moved by the same driving method, and thus a complicated structure is not required.

Meanwhile, in the example shown in the drawing, an example in which one linear detector 23 (for example, 23a) and the plurality of linear light sources 22 (for example, 22a, 22b, 22c, and 22d) are provided has been described, but a plurality of linear detectors 23 and one linear light source 22 may be provided.

Ninth Embodiment

Next, a ninth embodiment of the present invention will be described.

The present embodiment shows an example in which a light source and a linear detector 23 are made to selectively correspond to each other by moving the light source with respect to an optical system and a slit without moving a linear light source 22 including the optical system and the slit as described in the sixth embodiment.

Figure 14A:
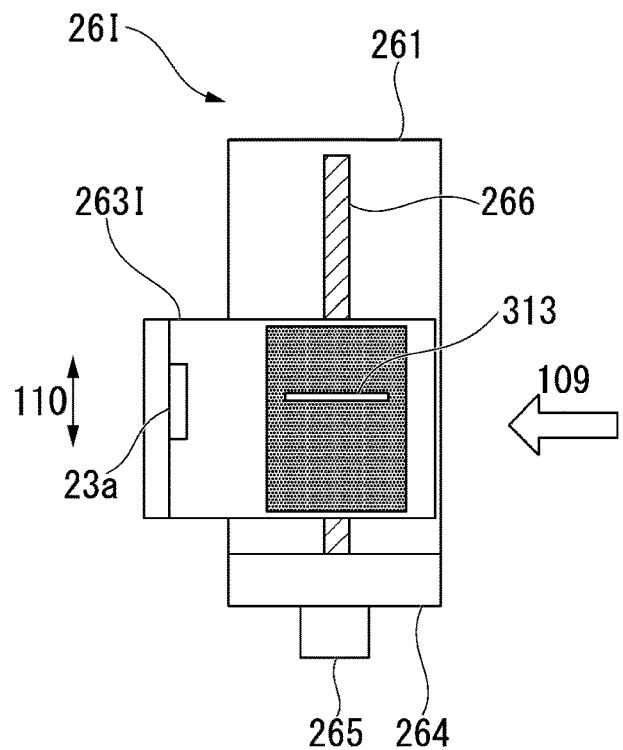
FIG. 14A is a diagram showing an example of a driving mechanism according to a ninth embodiment.
Figure 14B:
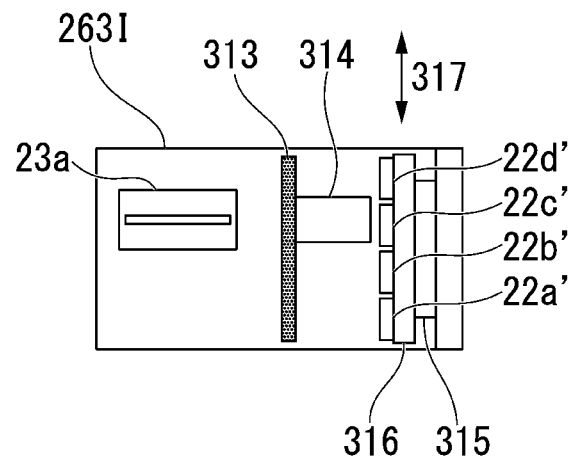
FIG. 14B is a diagram showing an example of the driving mechanism according to the ninth embodiment.

FIGS. 14A and 14B are diagrams showing an example of a driving mechanism 26I according to the ninth embodiment. FIG. 14A is a diagram showing an example of the driving mechanism 26I when viewed in the same direction as in FIG. 11A. FIG. 14B is a diagram showing a portion of the driving mechanism 26I viewed in a direction of an arrow 109 in FIG. 14A. In the example shown in the drawing, one linear detector 23a is disposed in a connection member 2631 of the driving mechanism 26I. Further, a stage portion 316 is provided in the connection member 263I through a linear guide 315, and four light sources 22a', 22b', 22c', and 22d' are disposed in the stage portion 316. A light source element such as an LED can be used for the light source, but a slit and the like may not be provided for each light source as shown in FIGS. 4A and 4B. Here, the stage portion 316 is movable in a direction of an arrow 317 using an actuator not shown in the drawing.

In addition, an illumination optical system 314 and a slit 313 provided on a front surface (a surface on a side opposite to a light source side) of the illumination optical system 314 are fixed on a side opposite to the stage portion 316 with four light sources 22a', 22b', 22c', and 22d' therebetween. The illumination optical system 314 guides light emitted from one light source selected from the four light sources 22a', 22b', 22c', and 22d' to the slit 313. In the example shown in the drawing, the light source 22c' is selected, and light emitted from the light source 22c' is emitted as linear light from a slit-like opening of the slit 313 through the illumination optical system 314.

Here, the slit 313 may be fixed to the connection member 2631 so as to have a positional relationship in which a plane determined from a slit direction (longitudinal direction) of the slit 313 and an optical axis direction of light emitted from the slit 313 and a plane determined from a line direction (longitudinal direction) of the linear detector 23a and an optical axis direction of light incident on the linear detector 23a are the same plane and a positional relationship in which the respective optical axes thereof are orthogonal to each other. Meanwhile, the slit 313 may be fixed to the connection member 2631 so as to have a positional relationship in which a plane determined from a slit direction (longitudinal direction) of the slit 313 and an optical axis direction of light emitted from the slit 313 and a plane determined from a line direction (longitudinal direction) of the linear detector 23a and an optical axis direction of light incident on the linear detector 23a are planes parallel to each other. That is, one light source selected from the four light sources 22a', 22b', 22c', and 22d' and the linear detector 23a have a positional relationship in which the light source and the linear detector correspond to each other within an imaging surface of a microscope 10.

In the example shown in the drawing, the light source 22c' is selected, and the light source 22c' and the linear detector 23a have a positional relationship in which the light source and the linear detector correspond to each other. However, in a case where excitation using any one of the other light sources 22a', 22b', and 22d' is required, a desired light source is moved to a corresponding position by moving the stage portion 316 at any time. A processing device 30 drives a stepping motor 265 in a state where any one light source is selected, so that it is possible to detect (capture) an image of an observation target for each line while integrally and translationally moving the entire optical system provided in the connection member 2631 in a scanning direction.

Thereby, in the present embodiment, when a plurality of light sources are used, the light source can be selectively used by moving only the light source element without moving the optical system and the slit, and thus an optical element can be made common and can be configured at lower costs than in a case where a plurality of linear light sources are moved.

Tenth Embodiment

Next, a tenth embodiment of the present invention will be described.

The present embodiment is a modification example of the ninth embodiment and will be described with reference to FIG. 15.

Figure 15:
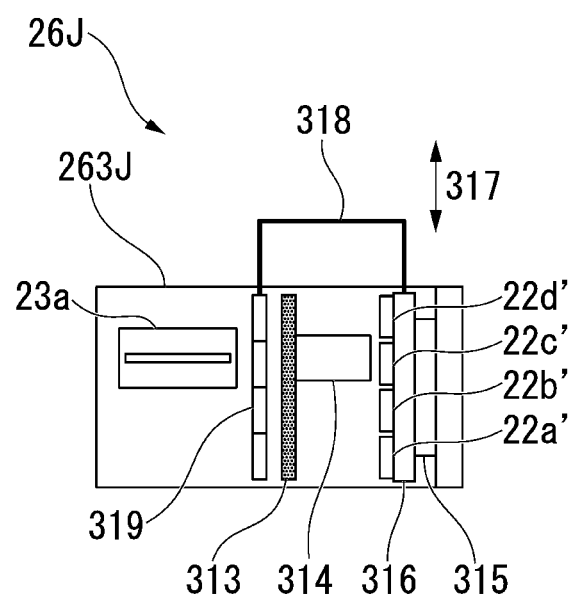
FIG. 15 is a diagram showing an example of a driving mechanism according to a tenth embodiment.

FIG. 15 is a diagram showing an example of a driving mechanism 26J according to the tenth embodiment. This drawing corresponds to FIG. 14B and shows a portion of a connection member 263J of the driving mechanism 26J. The connection member 263J shown in the drawing is different from that in the example shown in FIG. 14B in that an excitation filter unit 319 having four excitation filters connected thereto and a stage portion 316 are connected to each other through a filter connection member 318.

The four excitation filters are excitation filters which correspond to the respective light sources of the four light sources 22a', 22b', 22c', and 22d' and transmit only desired excitation wavelengths from the light sources. Each of the four excitation filters and each of the four light sources 22a', 22b', 22c', and 22d' are disposed so as to have a positional relationship in which the excitation filter and the light source correspond to (face) each other with a slit 313 and an illumination optical system 314 interposed therebetween, and integrally move relative to the slit 313 while maintaining positional relationships between the light sources and the excitation filters in association with the movement of the stage portion 316. Thereby, an excitation filter transmitting only a desired excitation wavelength is selected in response to a light source selected by moving the stage portion 316.

Eleventh Embodiment

Next, an eleventh embodiment of the present invention will be described.

The confocal scanner 20 (20D) in each of the above-described embodiments may be configured as a confocal microscope integrated with a microscope 10. The confocal microscope includes, for example, at least a sample stage 12 on which an observation target is placed, an objective lens 13, an imaging lens 15 that captures an image of the observation target which is incident through the objective lens 13, a linear light source 22 that emits linear light with which the observation target is illuminated through the imaging lens 15 and the objective lens 13, a linear detector 23 which is disposed at a positional relationship corresponding to the linear light source 22 within an imaging surface of the microscope 10 and which includes a linear CMOS element (detection unit) detecting fluorescent light emitted by the observation target and incident through the objective lens 13 and the imaging lens 15 for each line, and a driving mechanism 26 that translationally moves the linear light source 22 and the linear detector 23 with respect to the microscope. In this manner, even when the confocal scanner 20 (20D) and the microscope 10 are integrated with each other, the same effects as those in the above-described embodiments are exhibited.

Meanwhile, some or all of the functions of the units included in the processing device 30 in the above-described embodiments may be realized by a computer. In this case, the above-described functions may be realized by recording a program for realizing the above-described functions in a computer readable recording medium, causing a computer system to read the program recorded in the recording medium, and executing the program. Meanwhile, the "computer system" mentioned herein is a computer system built into the processing device 30 and may include an OS or hardware such as peripherals.

In addition, it is assumed that the "computer system" also includes homepage providing environments (or display environments) as long as it uses a WWW system.

In addition, examples of the "computer-readable recording medium" refers to a portable medium such as a flexible disk, a magneto-optical disk, a ROM, or a CD-ROM and a storage device such as a hard disk built into a computer system. Further, it is assumed that the "computer-readable recording medium" may also include a medium that dynamically stores a program for a predetermined period of time like a communication line in a case where a program is transmitted through a network such as the Internet or a communication line such as a telephone line and a medium that stores a program for a fixed period of time like a volatile memory in a computer system which serves as a server or a client in that case. In addition, the program may be a program for realizing some of the above-described functions or may be a program capable of realizing the above-described functions in combination with a program recorded in the computer system in advance.

In addition, a portion or the entirety of the processing device 30 in the above-described embodiments may be realized as an integrated circuit such as a large scale integration (LSI). The functional blocks of the processing device 30 may be individually configured as processors, or some or all of the functional blocks may be configured as processors in an integrated manner. In addition, a method of configuring an integrated circuit is not limited to an LSI and may be realized using a dedicated circuit or a general-purpose processor. In addition, when an integrated circuit technique replacing an LSI appears with the progress of a semiconductor technique, an integrated circuit according to the technique may be used.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

REFERENCE SIGNS LIST

1 Microscope system
10 Microscope
20, 20D Confocal scanner
11 Transparent illumination
12 Sample stage
13 Objective lens
14 Folding mirror
15 Imaging lens
21 Dichroic mirror
22 Linear light source
23 Linear detector
24 Excitation filter
25 Fluorescent light filter
26 Driving mechanism
30 Processing device
40 Monitor
221 LED element
222 Light guide plate
223 Slit
261 Linear guide
262 Stage portion
263 Connection member
264 Fixed block
265 Stepping motor
266 Ball screw

The invention claimed is:

1. A confocal scanner, the confocal scanner comprising:
a linear light source configured to emit a light which is a line-shaped light;
a dichroic mirror configured to reflect the light from the linear light source toward an imaging lens provided in a microscope, a light from the imaging lens being transmitted through the dichroic mirror;
a linear detector including a plurality of linear detecting elements arranged linearly, the linear detector being configured to detect the light reflected from an observation target placed on a stage of the microscope and transmitted through the dichroic mirror; and
a moving mechanism configured to translationally move the linear light source and the linear detector with respect to the microscope,
wherein the linear light source and the linear detector are disposed so as to have a positional relationship in which the linear light source and the linear detector correspond to each other within imaging surfaces of the imaging lens at conjugate positions with respect to a focal plane of the microscope,
wherein the moving mechanism comprises a connection member to which the linear light source and the linear detector are fixed, and the moving mechanism is configured to move the connection member to translationally move the linear light source and the linear detector in a direction orthogonal to a longitudinal direction of the line-shaped light emitted from the linear light source and a longitudinal direction of the linear detector.

2. The confocal scanner according to claim 1,
wherein the moving mechanism translationally moves the linear light source and the linear detector on the imaging surfaces of the imaging lens while maintaining the positional relationship in which the linear light source and the linear detector correspond to each other.

3. The confocal scanner according to claim 1,
wherein the linear light source and the linear detector are disposed so as to have a positional relationship in which a plane determined from a longitudinal direction of the linear light source and an optical axis direction of light emitted from the linear light source and a plane determined from a longitudinal direction of the linear detector and an optical axis direction of light incident on the linear detector are the same plane or planes parallel to each other, and
wherein the moving mechanism translationally moves the linear light source and the linear detector in a direction orthogonal to the same plane or the planes parallel to each other.

4. The confocal scanner according to claim 3,
wherein the linear light source and the linear detector are disposed so as to have a positional relationship in which the plane determined from the longitudinal direction of the linear light source and the optical axis direction of the light emitted from the linear light source and the plane determined from the longitudinal direction of the linear detector and the optical axis direction of the light incident on the linear detector are the same plane and a positional relationship in which an optical axis of the linear light source and an optical axis of the linear detector intersect at the dichroic mirror.

5. The confocal scanner according to claim 1,
wherein the moving mechanism integrally and translationally moves the linear light source and the linear detector.

6. The confocal scanner according to claim 1, wherein the linear light source comprises a plurality of linear light elements and the linear detector comprises a plurality of linear detecting elements,
- the number of the plurality of linear light elements is the same as the number of the plurality of linear detecting elements, and
- each of the plurality of linear light elements and each of the plurality of linear detecting elements which are in pairs are disposed so as to have a positional relationship in which the linear light element and the linear detecting element correspond to each other.

7. The confocal scanner according to claim 6,
- wherein each of the plurality of linear light elements and each of the plurality of linear detecting elements which are in pairs are disposed so as to have a positional relationship in which a plane determined from a longitudinal direction of each of the plurality of linear light elements and an optical axis direction of the light emitted from the linear light element and a plane determined from a longitudinal direction of each of the plurality of linear detecting elements and an optical axis direction of light incident on the linear detecting element are the same plane or planes parallel to each other, and
- wherein the moving mechanism translationally moves each of the plurality of linear light elements and each of the plurality of linear detecting elements which are in pairs in a direction orthogonal to the same plane or the planes parallel to each other.

8. The confocal scanner according to claim 1, wherein the linear light source comprises a plurality of linear light elements,
- wherein one linear light element of the plurality of linear light elements and the linear detector are disposed so as to be movable to correspond to each other by relatively moving the plurality of linear light elements and the linear detector.

9. The confocal scanner according to claim 1,
- wherein the linear light source includes a plurality of light elements, and a slit, and
- wherein the plurality of light elements and the slit are disposed so that a wavelength of one light source of the plurality of light elements is selected by relatively moving the plurality of light elements with respect to the slit.

10. A microscope system comprising:
the confocal scanner according to claim 1; and
a microscope on which the confocal scanner is mounted.

11. The microscope system according to claim 10,
- wherein the moving mechanism translationally moves the linear light source and the linear detector on imaging surfaces of the imaging lens while maintaining the positional relationship in which the linear light source and the linear detector correspond to each other.

12. The microscope system according claim 10,
- wherein the linear light source and the linear detector are disposed so as to have a positional relationship in which a plane determined from a longitudinal direction of the linear light source and an optical axis direction of light emitted from the linear light source and a plane determined from a longitudinal direction of the linear detector and an optical axis direction of light incident on the linear detector are the same plane or planes parallel to each other, and
- wherein the moving mechanism translationally moves the linear light source and the linear detector in a direction orthogonal to the same plane or the planes parallel to each other.

13. The microscope system according to claim 12,
- wherein the linear light source and the linear detector are disposed so as to have a positional relationship in which the plane determined from the longitudinal direction of the linear light source and the optical axis direction of the light emitted from the linear light source and the plane determined from the longitudinal direction of the linear detector and the optical axis direction of the light incident on the linear detector are the same plane and a positional relationship in which an optical axis of the linear light source and an optical axis of the linear detector intersect at the dichroic mirror.

14. The microscope system according to claim 10,
- wherein the moving mechanism integrally and translationally moves the linear light source and the linear detector.

15. The microscope system according to claim 10, wherein the linear light source comprises a plurality of linear light elements and the linear detector comprises a plurality of linear detecting elements,
- the number of the plurality of linear light elements is the same as the number of the plurality of linear detecting elements, and
- wherein each of the plurality of linear light elements and each of the plurality of linear detecting elements which are in pairs are disposed so as to have a positional relationship in which the linear light element and the linear detecting element correspond to each other.

16. The microscope system according to claim 15,
- wherein each of the plurality of linear light elements and each of the plurality of linear detecting elements which are in pairs are disposed so as to have a positional relationship in which a plane determined from a longitudinal direction of each of the plurality of linear light elements and an optical axis direction of the light emitted from the linear light element and a plane determined from a longitudinal direction of each of the plurality of linear detecting elements and an optical axis direction of light incident on the linear detecting element are the same plane or planes parallel to each other, and
- wherein the moving mechanism translationally moves each of the plurality of linear light elements and each of the plurality of linear detecting elements which are in pairs in a direction orthogonal to the same plane or the planes parallel to each other.

17. A confocal microscope comprising:
a stage on which an observation target is placed;
an objective lens;
an imaging lens configured to form an image of observation target;
a linear light source configured to emit a light which is a line-shaped light with which the observation target is illuminated through the imaging lens and the objective lens;
a dichroic mirror configured to reflect the light from the linear light source toward the imaging lens;
a linear detector including a plurality of linear detecting elements arranged linearly, the linear detector being configured to detect a light emitted by the observation target and incident through the objective lens and the imaging lens and transmitted through the dichroic mirror; and a moving mechanism configured to translationally move the linear light source and the linear detector with respect to the imaging lens, wherein the linear light source and the linear detector are disposed so as to have a positional relationship in which the linear light source and the linear detector correspond to each other within imaging surfaces of the imaging lens at conjugate positions with respect to a focal plane of the confocal microscope, wherein the moving mechanism comprises a connection member to which the linear light source and the linear detector are fixed, and the moving mechanism is configured to move the connection member to translationally move the linear light source and the linear detector in a direction orthogonal to a longitudinal direction of the line-shaped light emitted from the linear light source and a longitudinal direction of the linear detector.

* * * * *